(12) United States Patent
Hayem et al.

(10) Patent No.: US 8,005,503 B2
(45) Date of Patent: Aug. 23, 2011

(54) SYNCHRONIZATION OF MULTIPLE PROCESSORS IN A MULTI-MODE WIRELESS COMMUNICATION DEVICE

(75) Inventors: Frederic Hayem, San Diego, CA (US); Leo Borromeo, San Diego, CA (US); Michiel Lötter, San Diego, CA (US)

(73) Assignee: Broadcom Corporation

( * ) Notice: Subject to any disclaimer, the term of this patent is extended or adjusted under 35 U.S.C. 154(b) by 1333 days.

(21) Appl. No.: 10/733,856

(22) Filed: Dec. 11, 2003

(65) Prior Publication Data

US 2004/0185899 A1    Sep. 23, 2004

Related U.S. Application Data

(60) Provisional application No. 60/434,448, filed on Dec. 18, 2002.

(51) Int. Cl.
*H04M 1/00* (2006.01)
(52) U.S. Cl. .................. 455/552.1; 455/411; 455/435.1; 455/436; 455/500; 370/241; 370/331
(58) Field of Classification Search ............... 455/552.1, 455/553.1, 502, 13.3, 411, 435.1; 370/503, 370/350, 304, 324; 324/705
See application file for complete search history.

(56) References Cited

U.S. PATENT DOCUMENTS

| 5,251,220 A * | 10/1993 | Schutte ........................ 714/809 |
| 5,918,040 A * | 6/1999 | Jarvis ............................ 713/375 |
| 6,098,178 A * | 8/2000 | Moretti et al. ................ 713/500 |
| 6,125,404 A * | 9/2000 | Vaglica et al. ................ 713/375 |
| 6,219,624 B1 * | 4/2001 | Russ ............................... 702/75 |
| 6,594,242 B1 * | 7/2003 | Kransmo ...................... 370/331 |
| 6,810,405 B1 * | 10/2004 | LaRue et al. .................. 707/201 |
| 6,834,091 B2 * | 12/2004 | Litwin et al. .................. 375/356 |
| 2001/0055980 A1 * | 12/2001 | Sato .............................. 455/552 |
| 2002/0141441 A1 * | 10/2002 | Neumann et al. ............. 370/465 |
| 2002/0186754 A1 * | 12/2002 | Kawai ........................... 375/147 |
| 2003/0067894 A1 * | 4/2003 | Schmidt ........................ 370/329 |

* cited by examiner

*Primary Examiner* — Patrick N Edouard
*Assistant Examiner* — Fred A Casca
(74) *Attorney, Agent, or Firm* — McAndrews, Held & Malloy, Ltd.

(57) ABSTRACT

A method for effecting timing synchronization within a multi-mode communication device is disclosed herein. The method includes configuring a host baseband processor of the multi-mode device to operate in accordance with a first wireless communications protocol of a first wireless communications system. A baseband co-processor of the device is also configured to operate in accordance with a second wireless communications protocol of a second wireless communications system. The method includes establishing, within the device, timing synchronization between the first and second communication systems on the basis of timing information transferred to the host baseband processor from the baseband co-processor.

35 Claims, 13 Drawing Sheets

SYNCHRONIZATION OF MULTIPLE PROCESSORS IN A MULTI-MODE WIRELESS COMMUNICATION DEVICE

CROSS-REFERENCE TO RELATED APPLICATIONS

This application claims priority under 35 U.S.C. §119(e) to U.S. Provisional Patent Application Ser. No. 60/434,448, filed Dec. 18, 2002, entitled MULTI-PROCESSOR PLATFORM FOR WIRELESS COMMUNICATION TERMINAL HAVING PARTITIONED PROTOCOL STACK, and is related to copending U.S. patent application Ser. No. 10/733,861, filed Dec. 11, 2003, and entitled MULTIPROCESSOR PLATFORM FOR WIRELESS COMMUNICATION TERMINAL HAVING PARTITIONED PROTOCOL STACK.

FIELD OF THE INVENTION

The present invention relates to wireless communication systems and, more particularly, to synchronization of multiple processors included within a multi-mode wireless communications device.

BACKGROUND OF THE INVENTION

It is becoming increasingly apparent that communication systems involving fixed client terminals and server units are no longer the only pervasive means of communication available to large segments of society. In particular, certain current and next-generation client devices are no longer tied to use at a single physical location or limited to a single application. Such portable client terminals are predicted to emerge as ubiquitous communication and computing platforms, capable of enabling the convergence of consumer electronics, computing, and communications. In order for this type of convergence to fulfill its promise, client terminals will need to become capable of accessing a multiplicity of applications and services while seamlessly connecting to a variety of wireless access networks.

Such convergence may be evaluated from at least two perspectives. First, the manner in which multiple wireless networks may be configured to facilitate such convergence needs to be considered. This will enable the creation of user scenarios aiding in the development of mobile terminal architectures designed to interoperate with such multiple networks. Secondly, convergence from the perspective of end-users should be understood in order that any proposed system solutions accommodate the needs of such end-users to the greatest extent possible given applicable network constraints.

From a network perspective, efforts are being made to achieve such convergence through integration of wireless local area networks ("WLANs") and third-generation ("3G") cellular systems developed in accordance with the Universal Mobile Telecommunications System (UMTS). Such 3G cellular systems include, for example, integrated systems based upon Global System Mobile (GSM) and General Packet Radio Service (GPRS) (i.e., GSM/GPRS systems), as well as wideband code division multiple access systems (WCDMA). Varying degrees of integration of a 3G cellular system and a WLAN may be achieved. For example, a certain degree of integration may be obtained merely through sharing of billing and subscriber profile information. On the other hand, a relatively greater degree of integration may be achieved through integration of the core network functionality of the WLAN and the 3G cellular system. Although the latter approach promises to yield a more complete set of network functions, it would constitute an extremely complicated and expensive undertaking. Furthermore, in view of the evolving nature of both the WLAN and UMTS standards, near term prospects of comprehensive integration of WLAN and 3G cellular systems seem rather dim. Accordingly, it is probable that the former type of integration and coordination among systems will likely be the only approach to be implemented within the foreseeable future.

Turning now to FIG. 1, an illustrative representation is provided of an exemplary wireless communication system 100 within which the former type of integration may be attained by connecting the billing and subscriber profiles for a WLAN 104 and a UMTS network 106. As may be appreciated from FIG. 1, the WLAN 104 and UMTS network 106 share a common authentication system 110 and a common billing system 114.

The UMTS network 106 is comprised of several primary portions including a mobile subscriber terminal 118 and associated Subscriber Identity Module (SIM) 120, a UMTS radio network 124, and a UMTS core network 126 containing switching infrastructure and network intelligence. During operation of the system 100, the subscriber terminal 118 communicates with base stations within the UMTS radio network 124. Such base stations convert radio signals from the subscriber terminal 118 into digital signals which are provided to the switching infrastructure within the UMTS core network 126. This switching infrastructure establishes call connections with other subscriber terminals, or routes the digital signal information to the public switched telephone network (PSTN) or other data network (e.g., the public packet data network (PPDN) or the Internet).

The SIM 120 is realized as an electronic card and provides subscriber identity information to the subscriber terminal 118, which transmits this information to the UMTS radio network 124 in order to gain access to the UMTS core network 126. The UMTS core network 126 then verifies the validity of the subscriber identification information before authorizing access to the subscriber terminal 118. Within the UMTS network 106, the SIM 120 is used as the primary subscriber identification and encryption mechanism, although this capability has not been standardized within WLAN environments. However, several approaches have been proposed for development of authentication and encryption solutions for deployment within WLANs using SIM/USIM technology.

It is anticipated that SIM/USIM technology will play a key role in enabling the convergence of WLAN and cellular systems at a network level by enabling joint authentication (and by implication also billing). It is further believed that this technology may play a key role in solving many of the security issues that have hindered deployment of WLAN systems.

From an end-user perspective, the promise of third generation wireless systems has always been the delivery of a diverse range of services to anyone, anywhere, anytime and at the lowest possible cost. During the early stages of the development of UMTS networks, the vision was that the combination of existing GSM/GPRS networks with the newly developed WCDMA networks would fulfill this promise. However, the development and commercialization of WLAN technologies (specifically 802.11a/b) has been gaining momentum. Among many experts, the current consensus seems to be that both systems will co-exist. In this regard it appears that end users will be less concerned with the availability of a particular technology than with the reliable delivery of multiple different types of advanced services. In order to enable such convergence of service offerings, network operators must ensure the availability of subscriber terminals capable of securely executing a number of different applications. In addition, it will also be desired to deliver such advanced services using the lowest-cost network infrastructure available. Accordingly, the architecture of next-generation mobile terminals will ideally be capable of receiving services or applications via a number of different bearer options (e.g. GSM/GPRS, WCDMA, and 802.11a/b).

Turning now to FIG. 2, a block diagram is provided of the baseband platform of a typical second generation (2G) wireless handset 200. As shown, handset 200 typically includes a processor 204 (e.g., an ARM7 or the equivalent) and a 16-bit DSP 208. Firmware of the DSP 208 is typically executed from ROM (not shown), while software executed by the processor 204 is stored in "off-chip" FLASH memory 212. The handset 200 also typically includes a limited amount of off-chip SRAM 216, as well as a SIM interface 220 configured to accept an electronic SIM card of the type described above. With slight modification, the platform 200 may also be used to implement dual-mode GSM/GPRS solutions. Typically, a processor 204 of higher speed (e.g., an ARM9 processor) is used in the GSM/GPRS handset, and the clock speed of the 16-bit DSP 208 is also increased. A higher-speed processor 204 such as the ARM9 is not only capable of running the GSM/GPRS protocol stack, but also of concurrently executing applications.

Accordingly, from an end user perspective a number of the ingredients necessary to support convergence are present within existing handset technology; namely, sufficient processing and computing capability to support a number of different applications and services, and a SIM interface enabling subscriber access to a unified authentication and billing platform. However, existing handsets are generally incapable of supporting multiple radio protocols or "bearers", thereby limiting the convergence of the different services offered via various bearers. For example, certain existing GSM handsets are capable of accessing and displaying information via Internet web browsing, but are not disposed to seamlessly roam between GSM networks and other types of radio networks such as, for example, WLAN, Bluetooth or 3G WCDMA networks.

Accordingly, it would be desirable to provide for seamless mobility between radio networks operative in accordance with different protocols. In order enable such mobility and the consequent convergence in services, it would also be desirable to provide a mobile wireless terminal that inexpensively supports operation of multiple bearers and services.

SUMMARY OF THE INVENTION

The present invention relates in one aspect to a multi-mode wireless communication device comprised of multiple synchronized processors. In particular, the wireless device includes a host baseband processor configured to operate in accordance with a first wireless communications protocol of a first wireless communications system. The device further includes a baseband co-processor configured to operate in accordance with a second wireless communications protocol of a second wireless communications system. A synchronization arrangement is provided for establishing timing synchronization between the first and second wireless communications systems within the device on the basis of timing information transferred to the host baseband processor from the baseband co-processor In a particular implementation establishing such timing synchronization involves issuing, from the host baseband processor, a timer capture interrupt to the baseband co-processor during a predetermined timer phase of said first wireless communications system. In response, the baseband co-processor provides the host baseband processor with at least one timer value pertinent to a timing state of the second wireless communications system.

In another aspect, the invention relates to a method for effecting timing synchronization within a multi-mode communication device. The method includes configuring a host baseband processor of the communication device to operate in accordance with a first wireless communications protocol of a first wireless communications system. A baseband co-processor within the device is also configured to operate in accordance with a second wireless communications protocol of a second wireless communications system. The method includes establishing, within the device, timing synchronization between the first and second communication systems on the basis of timing information transferred to the host baseband processor from the baseband co-processor. In certain implementations establishing such timing synchronization may include issuing a timer capture interrupt to the baseband co-processor. In response, the baseband co-processor provides at least one timer value pertinent to a timing state of the second wireless communications protocol to the baseband processor.

The present invention also pertains to a method for effecting timing synchronization between a first wireless communication system and a second wireless communication system within a multi-mode communication device. The method includes generating a timer capture interrupt during a predetermined timing phase of the first wireless communication system. A timer value of at least one timer pertinent to operation of the second wireless communication system is stored in response to the timer capture interrupt. The method further includes reading the timer value and determining a timing relationship between the first and second wireless communication systems based upon the timer value.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

The present invention is generally concerned with the timing relationships established between a wireless telecommunications device and the system environment in which it operates. More particularly, the present invention is concerned with such timing relationships in the situation when a single wireless telecommunications device is capable of operating in at least two telecommunication systems characterized by different protocols and timing arrangements.

A multi-mode wireless device in accordance with a particular embodiment of the present invention includes a host baseband processor disposed to operate in accordance with a first wireless communications protocol of a first wireless communications system. The timing of the host baseband processor is capable of being synchronized to the timing of a baseband co-processor also included within the wireless device. The baseband co-processor is configured to operate in accordance with a second wireless communications protocol of a second wireless communications system. As is described hereinafter, this timing synchronization may be effected on the basis of timing information transferred to the host baseband processor from the baseband co-processor.

In a particular implementation, the host baseband processor comprises a GSM/GPRS baseband processor and the baseband co-processor comprises a WCDMA baseband processor. In this implementation the GSM/GPRS baseband processor operates to synchronize the internal counters of the WCDMA baseband processor with its own internal counters. As is discussed below, in one approach this synchronization is initiated upon the GSM/GPRS baseband processor sending an interrupt to the WCDMA baseband processor when its counters reach a predetermined value. The interrupt then causes the counter values of the WCDMA baseband processor to be captured by the GSM/GPRS baseband processor, thereby enabling synchronization through determination of the relationship between the counters of the GSM/GPRS and WCDMA systems.

In an exemplary embodiment the timing synchronization scheme is disposed to be implemented within a multi-processor mobile wireless communications terminal configured with a layered software architecture as described in the above-referenced copending patent application. Attention is now directed to FIGS. 3-9, to which reference will now be made in describing such a layered software architecture in order to provide appropriate context for a description of the inventive timing synchronization technique.

Figure 3:
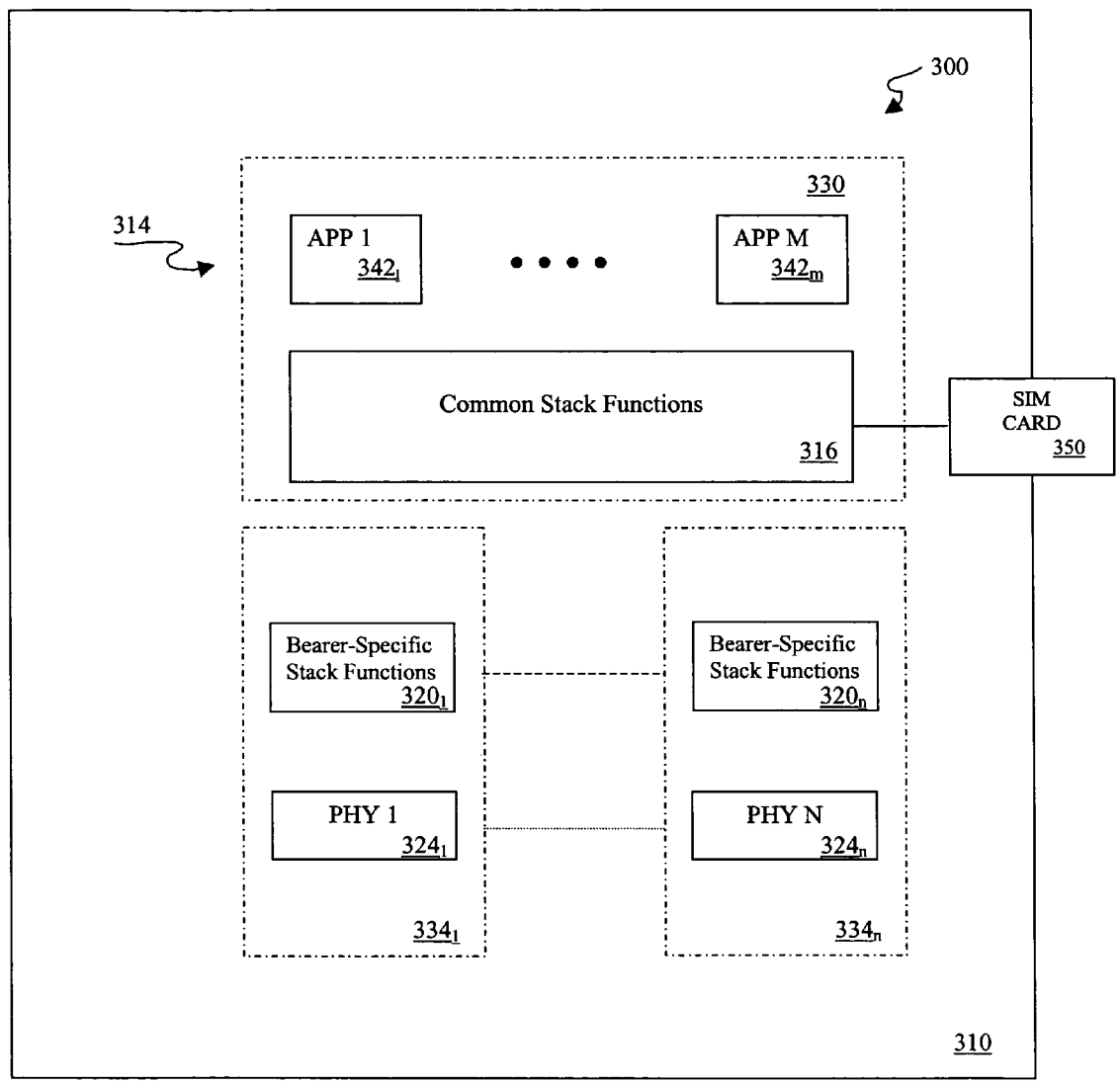
FIG. 3 illustratively represents an exemplary layered software architecture of the above-referenced copending patent application disposed within a mobile wireless communication terminal.

FIG. 3 illustratively represents an exemplary layered software architecture 300 of the above-referenced copending patent application disposed within a mobile wireless communication terminal 310. The layered software architecture 300 includes an application layer 314 in communication with a common stack functions layer 316. As is indicated by FIG. 3, a set of software routines defining an overall communication protocol for the mobile wireless communication terminal 310 are grouped into a stack of protocol layers; i.e., a protocol stack, comprised of the common stack functions layer 316, a bearer-specific stack layer 320 and a physical layer 324. The protocol stack divides the overall communication protocol into hierarchical layers of functionality.

As may be appreciated with reference to FIG. 3, the "lower" protocol layers comprised of the bearer-specific stack layer 320 and physical layer 324 are specific to a particular communication protocol and radio transceiver design, respectively. In contrast, the "upper" protocol layers comprised of the application layer 314 and common stack functions layer 316 are substantially independent of a particular communications protocol and transceiver design. It follows that in certain implementations it will be convenient to bifurcate the processing of such upper and lower protocol layers among first and second processor modules 330 and 334, respectively. In this way any second processor module 334 configured to implement a desired radio bearer and transceiver functionality may be inserted within the terminal 310 and communicate with the higher layer protocols executed by the first processor module 330.

It is thus apparent that the functionality of the layered software architecture 300 may be distributed as desired among a plurality of physical processing modules used to realize the communication terminal 310. Advantageously, the common stack functions layer 316 permits the data streams received from the bearer-specific stack layer 320 to appear the same to the application layer 314 irrespective of the particular communications protocols being implemented by such stack layer 320. This distribution of functionality enables such additional processing modules 334 to be removed and replaced with other modules configured to implement different communication protocols.

Referring to FIG. 3, the application layer 314 is comprised of a number of distinct application programs 342 (e.g., voice communication, web browsing, streaming video). Each application program 342 interacts with the common stack functions layer 316, which provides access to a particular bearer communication channel (e.g. GSM/GPRS, 802.11 or WCDMA). For example, in the case of WCDMA the common stack functions layer 316 would implement the functionality of the Non-Access Stratum (NAS), which performs user authentication based upon the information included within the SIM card 350 inserted into the mobile terminal 310. Since the NAS is executed by the first processing unit 330 independent of any bearer-specific processing unit 334, this authentication process is advantageously effected in a bearer-independent manner. That is, in this embodiment the user will always be authenticated using the information within the SIM card 350 irrespective of whether the chosen bearer is WCDMA, 802.11 or GSM/GPRS.

Figure 4:
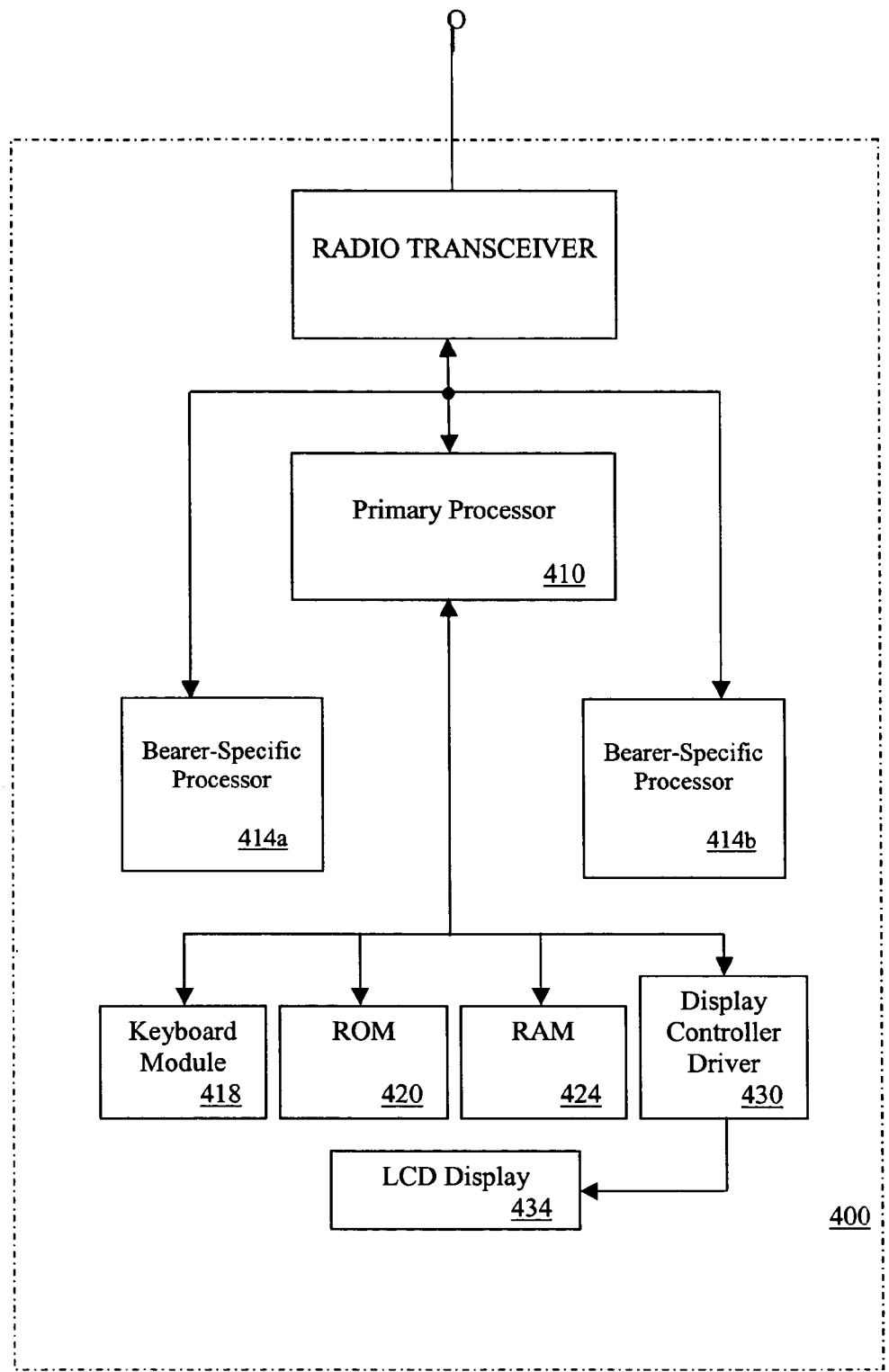
FIG. 4 is a block diagrammatic representation of a mobile terminal incorporating a layered software architecture partitioned among multiple processors.

Turning now to FIG. 4, a block diagrammatic representation is provided of a mobile terminal 400 incorporating a layered software architecture partitioned among multiple processors. As shown, the mobile terminal 400 includes a first processor 410 disposed to execute application layer routines and a set of common stack functions as described above with reference to FIG. 3. The mobile terminal 400 further includes a plurality of bearer-specific processors 414, each of which is configured to implement the bearer-specific and physical layers of the protocol stack for a given radio bearer. A conventional keyboard module 418 is interactively coupled to the processor 410, which may be implemented as a 16-bit microprocessor having ROM, RAM, a plurality of ports, analog to digital converters and a serial interface. In addition to the on-chip memory capacity, an external ROM 420 and an external RAM 424 may be provided for additional data processing and communication capacity. The terminal 400 further includes a display controller and associated driver circuits 430 configured to drive an LCD screen 434.

Figure 1:
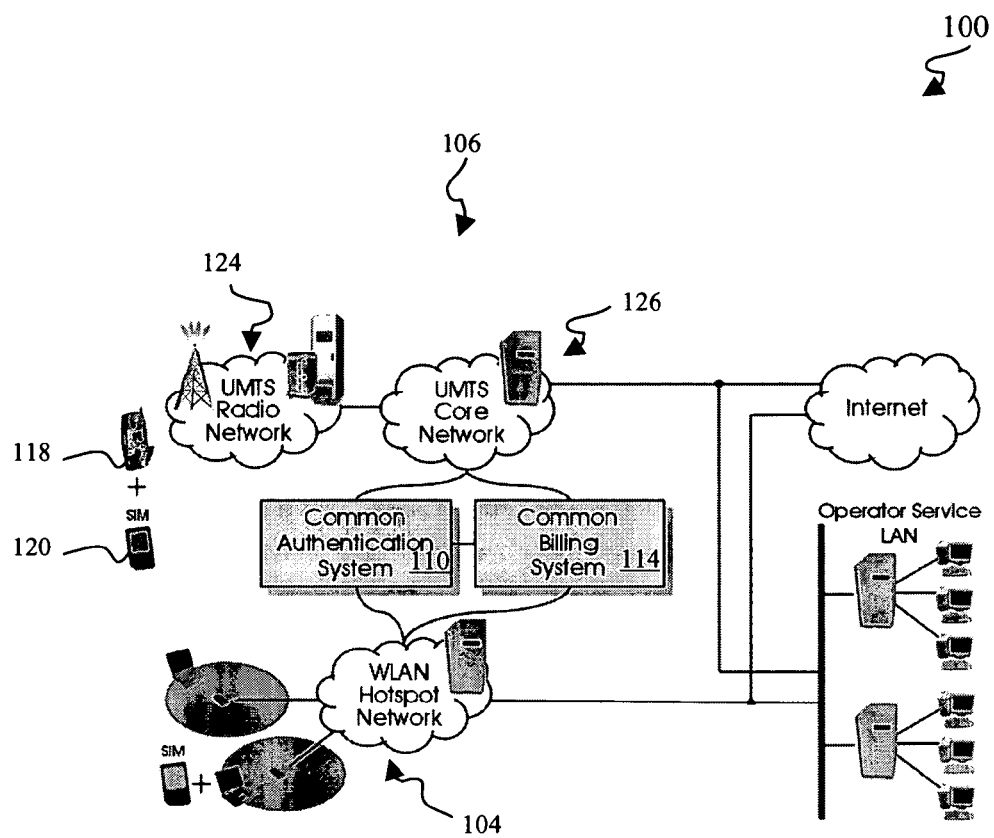
FIG. 1 provides an illustrative representation of an exemplary wireless communication system in which the billing and subscriber profiles for a wireless LAN and a UMTS network are connected.
Figure 2:
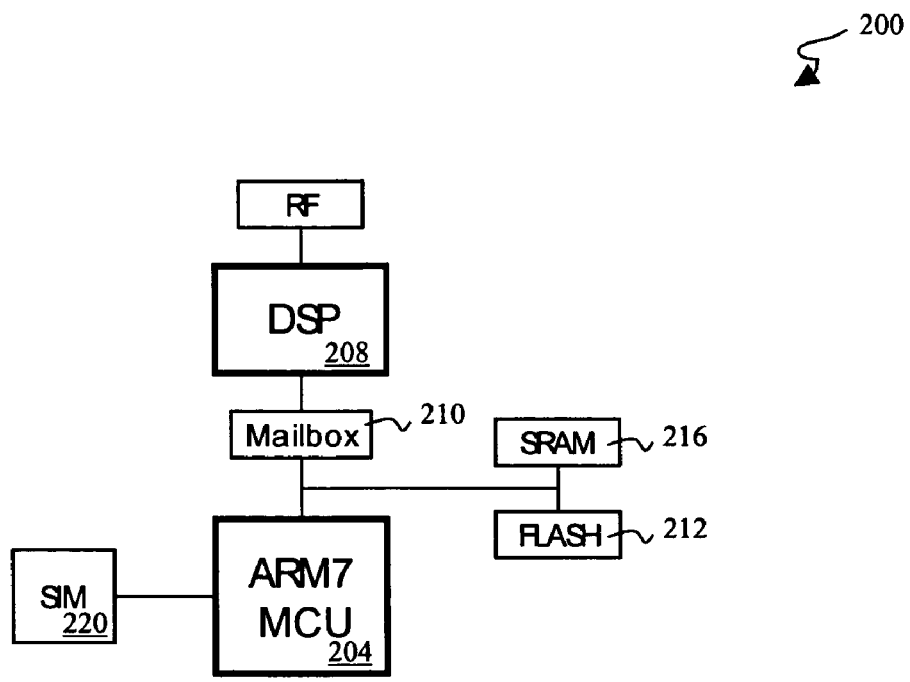
FIG. 2 is a block diagram of the baseband platform of a typical second generation (2G) wireless handset.

As is described hereinafter, in a particular embodiment the inventive software architecture 300 enables new, radio bearers to be added to an existing GSM/GPRS platform (see, e.g., FIG. 2) without modification of the processing modules effecting the core GSM/GPRS functionality. In this way the re-use of existing GSM/GPRS solutions is enabled, thereby permitting development of mobile terminal platforms facilitating convergence from both network and user perspectives. As a result, wireless semiconductor and mobile device manufacturers may efficiently and cost effectively migrate their existing single-mode GSM/GPRS platforms to dual-mode (GSM/GPRS & WCDMA) or even multi-mode (GSM/GPRS, WCDMA & 802.11) solutions. This enables the efficient and economical addition of new bearers with minimal redesign of existing mobile terminal platforms.

Figure 5:
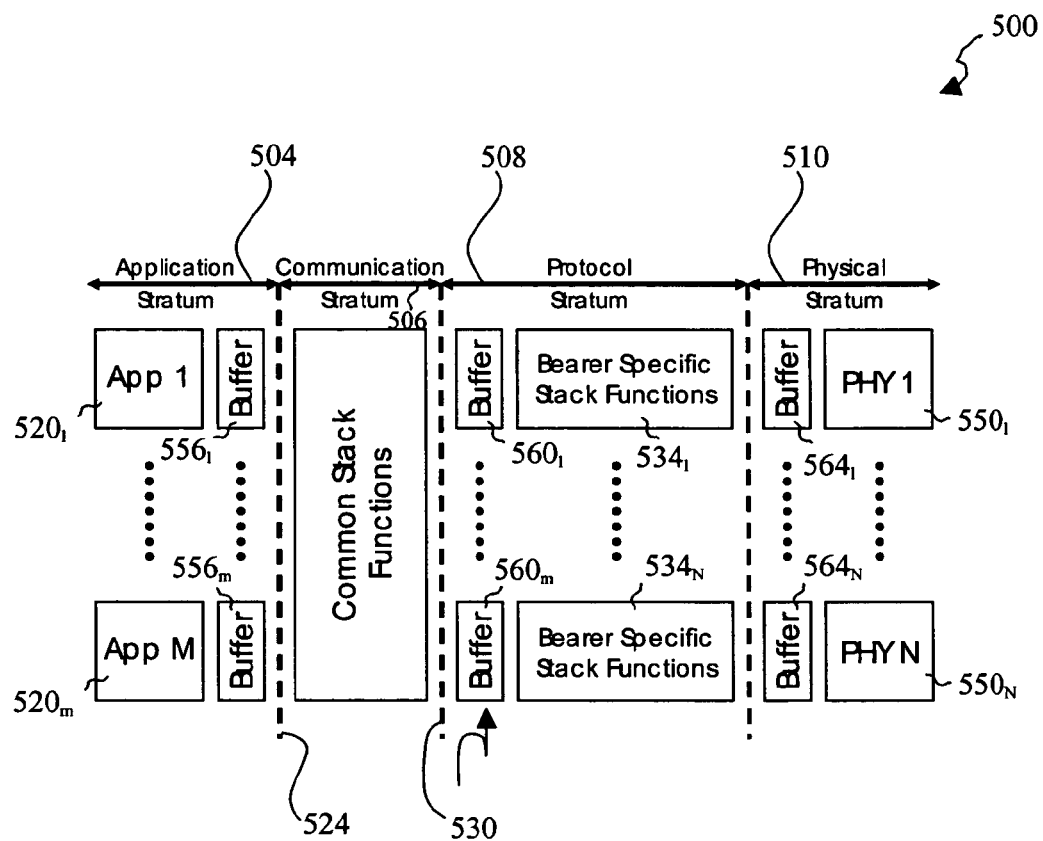
FIG. 5 provides a more detailed illustrative representation of a multi-strata software architecture as configured for incorporation within a multi-bearer wireless terminal.

Turning now to FIG. 5, a more detailed illustrative representation is provided of the software architecture 500 as configured for incorporation within a multi-bearer wireless terminal. As shown, the architecture 500 is organized within a set of four software strata, each of which is defined by different data flow characteristics: an application stratum 504, communication stratum 506, protocol stratum 508 and a physical stratum 510.

In the exemplary embodiment the application stratum 504 is comprised of a plurality of user-level application programs 520 (e.g., web browsing, text messaging). As a consequence, the data transfers occurring across the interface 524 between the communication stratum 506 and the application stratum 504 will tend to be "bursty" in nature.

The communication stratum 506 implements bearer-independent protocol stack functionality pertinent to maintenance of calls or other connections. In this regard the communication stratum 506 functions to authenticate users on various networks, select an appropriate bearer to use in transport of data packets, and maintain connections at the application level while switching between such bearers. That is, the communication stratum 506 provides application programs 520 access to different bearers, and provides authentication service for all bearers using SIM/USIM mechanisms. The data rates across the interface 530 between the communication stratum 506 and the protocol stratum 508 will tend to be more consistent than across the interface 524.

The protocol stratum 508 implements various bearer-specific protocol stack functions 534, and is configured to accommodate relatively high peak data rates across the interface 536 with the physical stratum 510. As shown, the physical stratum 510 is comprised of a number of physical layer modules 550 corresponding to various bearers (e.g., GSM/GPRS, WCDMA and 802.11). It should be noted that FIG. 5 provides a hierarchical view of the software architecture of FIG. 5, which is not constrained to be mapped to a particular hardware configuration.

As may be appreciated from FIG. 5, the multi-strata software architecture 500 relies upon buffering in order to equalize the data flow among the four defined software strata. Specifically, the application stratum 504 includes a plurality of buffers 556 respectively associated with the plurality of application programs 520, the protocol stratum includes a plurality of buffers 560 respectively associated with each bearer-specific stack functions 534, and the physical stratum 510 includes a plurality of buffers 564 respectively associated with each physical layer module 550. As is described hereinafter, the buffers 556, 560 and 564 enables the software architecture 500 to be implemented using a number of different hardware configurations.

Figure 6:
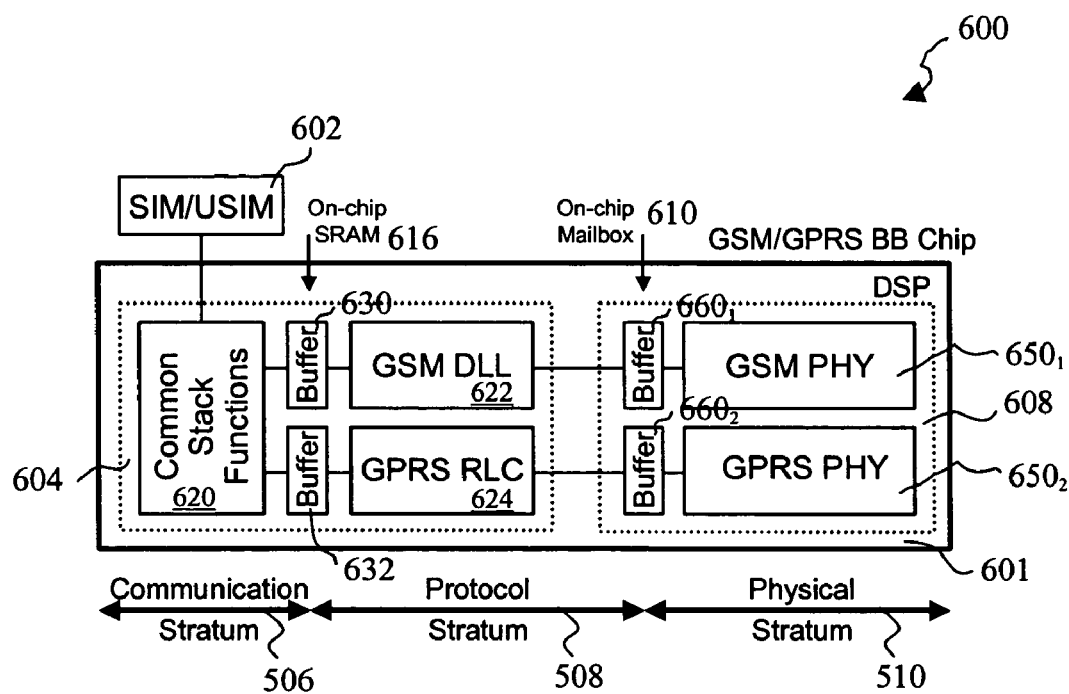
FIG. 6 illustratively represents a wireless terminal baseband platform obtained through mapping of the multi-strata software architecture of FIG. 5 to an existing GSM/GPRS platform architecture.

As an initial example, FIG. 6 illustratively represents a wireless terminal baseband platform 600 obtained through mapping of the inventive multi-strata software architecture 500 to an existing GSM/GPRS platform architecture. The platform 600 is realized using a single baseband integrated circuit or "chip" 601 comprised of a processor 604 (e.g., an ARM9 processor) and a digital signal processor (DSP) 608. In this approach, the functions associated with the communication stratum 508, protocol stratum 506 and SIM/USIM authentication process 602 are executed by the processor 604. As shown, the processor 604 executes common stack functions 620, as well as bearer-specific GSM stack functions 622 and GPRS stack functions 624. Buffers 630 and 632 serve to accommodate the different data rates associated with execution of the common stack functions 620 and the bearer-specific GSM and GPRS stack functions 622 and 624. Typically, data to be transmitted over the air is stored in on-chip SRAM 616 in order to enable efficient access to such data in connection with the addition or removal of header information and the like.

As is indicated by FIG. 6, the physical stratum 510 is implemented using the DSP 608. Although the GPRS physical layer module $650_2$ will typically re-use the functionality of the GSM physical layer module $650_1$, from a logical perspective distinct GSM and GPRS functionality may be split among the modules $650_1$ and $650_2$ as indicated. As shown, the interface between the protocol stratum and the physical stratum is implemented as an on-chip mailbox 610 containing a first physical stratum buffer $660_1$ associated with the GSM physical layer module $650_1$ and a second physical stratum buffer $660_2$ associated with the GPRS physical layer module $650_2$.

Figure 7:
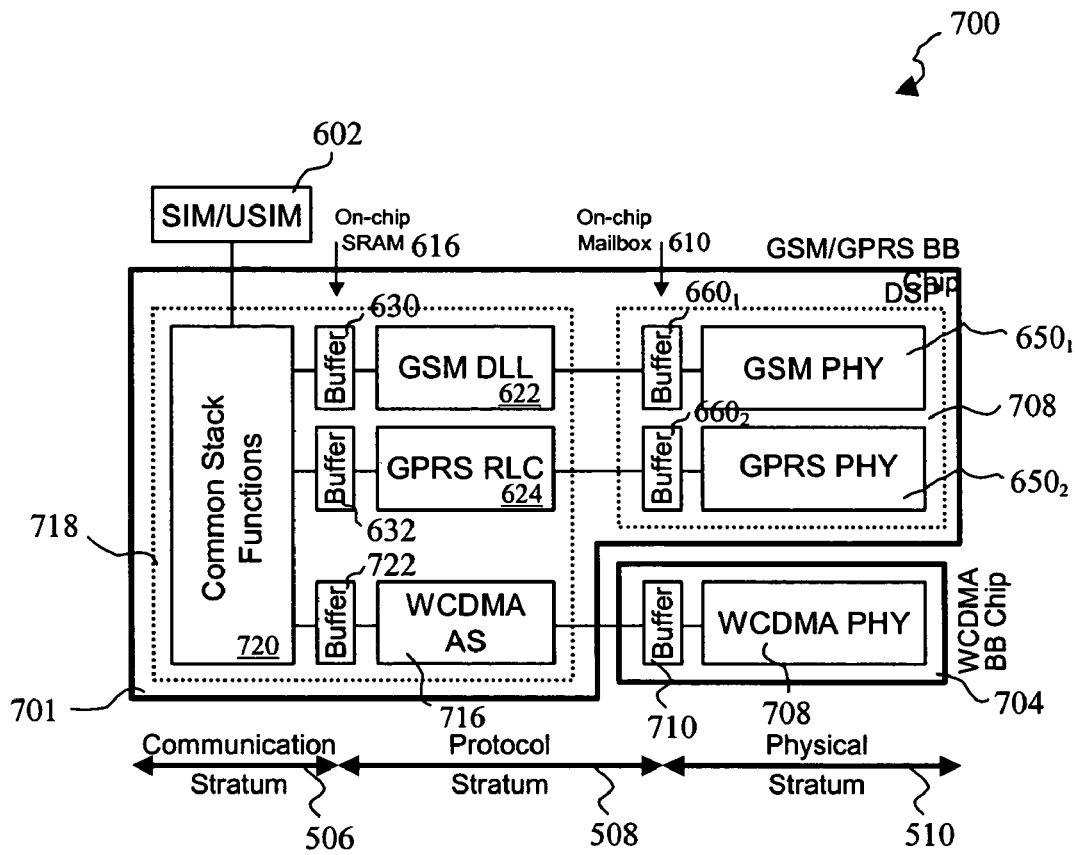
FIG. 7 illustrates a dual-mode wireless terminal baseband platform configured to provide both GSM/GPRS and WCDMA bearer services.

Turning now to FIG. 7, there is illustrated a dual-mode wireless terminal baseband platform 700 configured to provide both GSM/GPRS and WCDMA bearer services. As shown, the baseband platform 700 is architected similarly to the platform 600, and includes a primary baseband chip 701 comprised of a processor 718 (e.g., an ARM9 processor) and a digital signal processor (DSP) 708. However, the platform 700 further includes a WCDMA baseband chip 704 containing a WCDMA physical layer module 708 and associated buffer 710. The WCDMA baseband chip 704 operates to perform physical layer processing of WCDMA bearer signals, and interfaces with a bearer-specific WCDMA stack functions 716 executed by a processor 718. A buffer 722 accommodates the generally different data transfer rates associated with execution of the common stack functions 720 and the WCDMA stack functions 716.

In the embodiment of FIG. 7, the WCDMA stack functions 716 implemented using the processor 916 include the bearer-specific functions MAC, RLC, PDCP, BMC and RRC. In like manner the processor 916 is used to implement the common stack functions 720, which in WCDMA-based configurations would include NAS functions. Finally, the WCDMA baseband chip 704 is responsible for all WCDMA-related "Layer 1" or physical layer functions.

Again referring to FIG. 7, prudent engineering design suggests that the additional processing burden placed upon the processor 718 as a consequence of the addition of a WCDMA bearer should be evaluated. As an initial matter, the processing overhead associated with execution of the bearer-specific WCDMA stack module 716 is considered. For example, assuming that the WCDMA stack function 716, GSM stack functions 622, and GPRS stack functions 624 collectively require 30 MIPS of processing power, the processing activity of the processor 718 is profiled below in Table I.

TABLE I

| | |
|---|---|
| MIPS available (@ 104 MHz) | 104 |
| Number of wait states for external memory access | 10 |
| Cache hit ratio | 83% |
| Stack MIPS requirement | 30 |
| MIPS Remaining | 104 − 30 * 0.83 − (30 * 0.17 * 10) = 28.1 |

As may be apparent from Table I, the processor 718 possesses sufficient processing resources to implement both the bearer-specific WCDMA stack function 716 and GSM/GPRS stack functions 622 and 624. That is, the WCDMA stack function 716 are mapped onto a processor of the type employed in realizing existing GSM/GPRS solutions, while a WCDMA baseband chip 704 is provided to effect the WCDMA physical layer functions. Since the WCDMA physical layer is anticipated to be of substantially greater complexity than the GSM/GPRS physical layers, it may often be appropriate to realize the WCDMA baseband chip 704 as an application specific integrated circuit (ASIC) rather than using a general purpose digital signal processor (DSP). It is also of course possible to integrate all of the required physical, protocol and communications stratum GSM/GPRS and WCDMA functionality within a single baseband integrated circuit, but this nullifies the advantages associated with the modular approach described above.

As indicated above, when a pair of integrated circuits (i.e., primary baseband chip 701 and WCDMA baseband chip 704) are used to implement the dual-mode platform 700, memory mapping is used to define the interface between the protocol stratum and the physical stratum. Since this interface has the benefit of being standardized, the augmentation of existing 2.5G platforms to include WCDMA functionality is simplified. The memory mapping defining this interface will typically be effected by establishing a shared area within the memory of the primary baseband chip 701. This shared memory space may be logically configured as a dual-port RAM segmented into a number of areas, each containing a different type of data. These data types may comprise, for example, control information transferred between the protocol stacks and physical layers and uplink/downlink data. During operation of the platform 700, this shared memory space facilitates the exchange of data between the primary baseband chip 701 and WCDMA baseband chip 704 at regular intervals. Typically, such an interval will correspond to the duration of a frame (e.g., 10 ms in the case of WCDMA). At the end of each frame, the WCDMA baseband chip 704 will interrupt the primary baseband chip 701 and signal that new information is available for reading. When the primary baseband chip 701 reads such new information, it also writes new information into the shared memory space for reading by the WCDMA baseband chip 704. In the exemplary embodiment the primary baseband chip 701 may interrupt the WCDMA baseband chip 704 at any time should it desire to write new data into the shared memory space.

Figure 8:
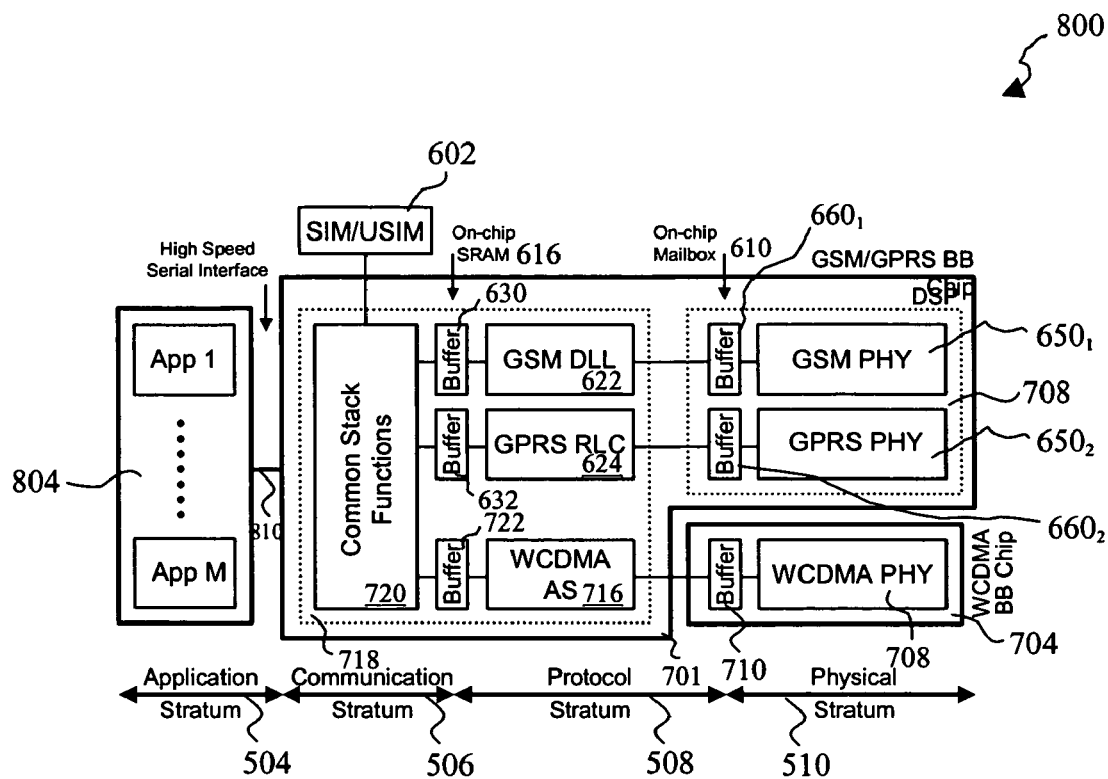
FIG. 8 illustrates a dual-mode wireless terminal baseband platform which illustrates the convergence of multiple user applications into a single device.

FIG. 8 illustrates a dual-mode wireless terminal baseband platform 800 which illustrates one manner in which various user applications may be converged into a single device. As was demonstrated above with reference to Table I, the present system enables existing 2.5G platforms to be augmented to accommodate new high-speed bearer services (e.g., WCDMA) while retaining sufficient significant processing resources to permit execution of user applications. For example, if the subject device is a feature phone, the remaining processing resources could be used to execute an application enabling decoding of a multi-media message or the like. Should more advanced application execution capabilities be required, the architecture depicted in FIG. 8 may be employed. As shown, in the embodiment of FIG. 8 the application stratum 504 has been mapped to an application processor 804 external to the primary baseband chip 701. The application processor 804 is configured to run an operating system capable of executing complex applications such as, for example, MPEG-4 encoding or the equivalent. As is illustrated by FIG. 8, the application processor 804 may be connected to the primary baseband chip 701 using a relatively fast serial connection 810. In general, the buffering of data between the application stratum 504 and the communication stratum 506 may be handled by the application processor 804.

Figure 9:
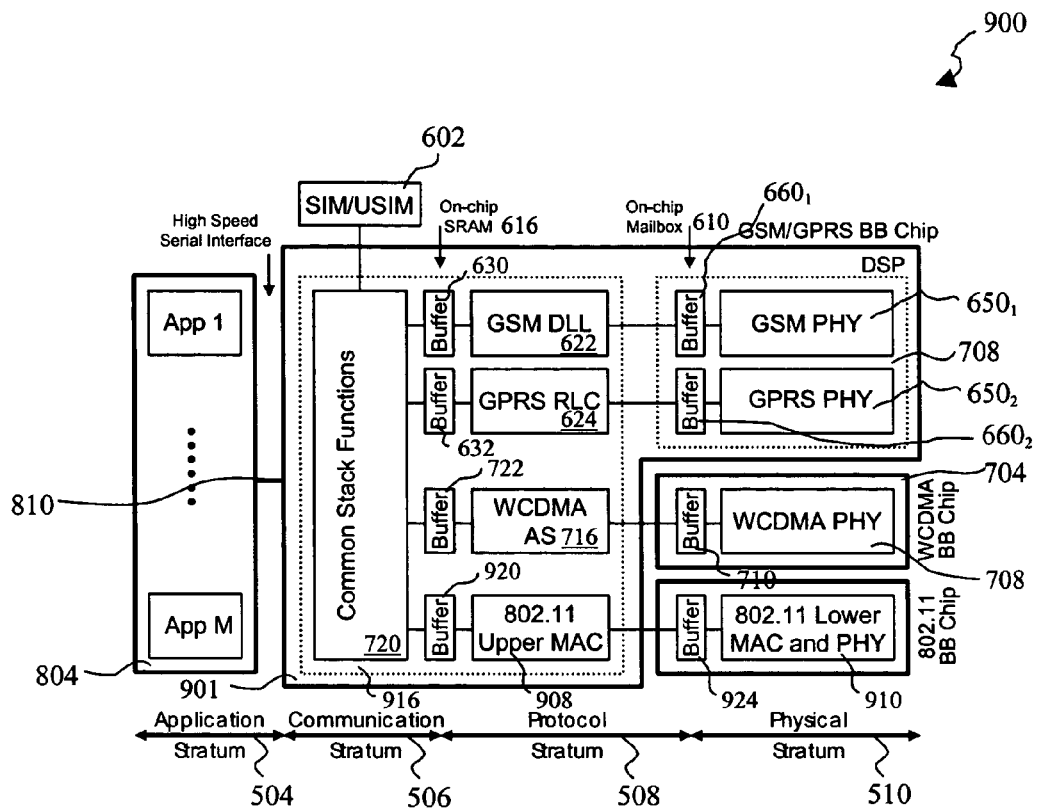
FIG. 9 shows a tri-mode wireless terminal platform configured to provide both GSM/GPRS, WCDMA and wireless local area network (WLAN) bearer services.

Referring now to FIG. 9, there is shown a tri-mode wireless terminal platform 900 configured to provide both GSM/GPRS, WCDMA and wireless local area network (WLAN) bearer services. As a consequence of the high peak data rates characterizing various WLAN protocols (e.g., IEEE 802.11), in the embodiment of FIG. 9 the protocol stratum 508 is seen to be implemented across a primary baseband chip 901 and a WLAN baseband chip 904. As shown, the protocol stratum 508 for the WLAN bearer is comprised of a WLAN upper medium access control (MAC) layer 908 executed by a processor 916, and a WLAN lower MAC & physical layer 910 executed by the WLAN baseband chip 904. The WLAN upper MAC layer 908 will generally be executed by the primary baseband chip 901. This bifurcation of the processing of the WLAN MAC layer will generally be desirable in view of the lower processing requirements associated with execution of the WLAN upper MAC layer 908 relative to execution of the WLAN lower MAC & physical layer 910; that is, execution of the WLAN lower MAC & physical layer 910 requires relatively more processing power and such execution will thus often be effected using a separate chip. Again, the different data flow characteristics of the WLAN upper MAC layer 908 and the WLAN lower MAC & physical layer 910 are accommodated using buffers 920 and 924, respectively.

When considering the addition of a new bearer to the inventive wireless terminal platform, at least two parameters will generally warrant consideration; namely, the peak and average data rates. While the peak data rate of the new bearer may be relatively high, average data rates may be significantly lower. For example, in the case of both 802.11b and WCDMA bearers the average data rates will typically be in the range of approximately only 200-384 kbps, while peak data rates may be significantly higher. This phenomenon tends to arise for at least two reasons. First, the 11 Mbps communication bandwidth offered by 802.11b systems is shared by all users within the applicable coverage area or "hotspot". Secondly, data and video compression enable better utilization of bandwidth and thus require a lower average data rate. Advantageously, splitting of the MAC layer in the manner described above may prevent bottlenecks from developing across the memory interfaces associated with the primary baseband chip during the processing of such peak data rates. By such splitting of the MAC layer, the peak data rate associated with processing of the lower MAC portions by a separate WLAM baseband chip may be on the order of 11 Mbps, while the average data rate associated with processing of the upper MAC portions via the primary baseband chip may be much lower (e.g., 300-400 Kbps).

From a logical perspective, each physical stratum buffer (i.e., the buffers 660, 710 and 924) is implemented as a dual-port RAM in the embodiment of FIG. 9. In the case of the physical stratum buffer 710, a first port is read and written to by the primary baseband chip 901 while a second port of the buffer 710 is asynchronously accessed by the WCDMA physical layer 708. It will generally be preferred to implement the buffer 710 such that the WCDMA baseband chip 704 does not serve as a master on the bus connected thereto. This results in all accesses of the first port being initiated by the primary baseband chip 901, which permits the bus to be easily shared by program and data memory.

Each protocol stratum buffer (i.e., the buffers 630, 632, 722 and 920) generally constitutes a block of locations within the memory of the primary baseband chip 901. This memory space may be allocated statically or dynamically, and is used primarily as a repository for data to be potentially re-transmitted to the extent required by the applicable Layer 2 protocols. For example, in the case of TCP the protocol stratum 508 may transmit a packet out and then wait for an acknowledgement (i.e., an ACK) to be received from the TCP peer to which the packet was transmitted. If an ACK is not received, the subject data is retransmitted from the protocol stratum 508. In this case the communication stratum 506 is not involved in the retransmission, which is consistent with an architecture in which such retransmission is implemented as a bearer specific function.

Similar to the protocol stratum buffers, an application stratum buffer (not shown) generally constitutes a block of locations within the memory of the primary baseband chip 901. This buffer functions to store data generated by applications until such data is ready for transmission. In this way the application stratum buffer supports the switching of the communication stratum between bearers of different speeds.

Referring again to FIGS. 7-9, the common stack functions 720 generally comprise various stack functions applicable to the bearers supported by the platform 700. One such common stack function 720 which will generally be implemented is the Session Management function. As an example of such implementation, consider the case when the multi-mode wireless terminal platform described herein is incorporated within a wireless terminal used to browse the Web. In this case the wireless terminal would initiate a TCP/IP session, during which the IP packets could be transported via any supported bearer (e.g. WCDMA or 802.11). That is, when a user of the wireless terminal "opens" its browser program, a connection (C1) is created through which a particular bearer (e.g., WCDMA) is used to transport the IP packets. Assume next that the user enters a hotspot area in which a faster 802.11 air interface is available. This situation is detected by the communication stratum 506, which will now invoke the 802.11 air interface to carry the IP packets. However, the connection is still C1 from a session perspective, and the user of the wireless terminal will be unaware that a different physical layer is being used to actually transport the IP packets.

The common stack functions 720 may also implement various authentication operations. To this end the common stack functions 720 will often contain all the software necessary to, for example, read a SIM card and generate the secure keys and the like necessary to encrypt data in connection with a desired authentication operation.

Again directing attention to FIGS. 7-9, in the exemplary embodiment the bearer-specific WCDMA stack functions 716 are comprised of the following: MAC (Medium Access Control), RLC (Radio Link Control), PDCP (Packet Data Converge Protocol) and RRC (Radio Resource Control). The MAC, RLC and PDCP functions are involved in regulating functionality within the data domain, while the RRC is responsible for control functionality. In contrast, bearer-specific WLAN protocol stacks generally consist only of a MAC layer.

Figure 10:
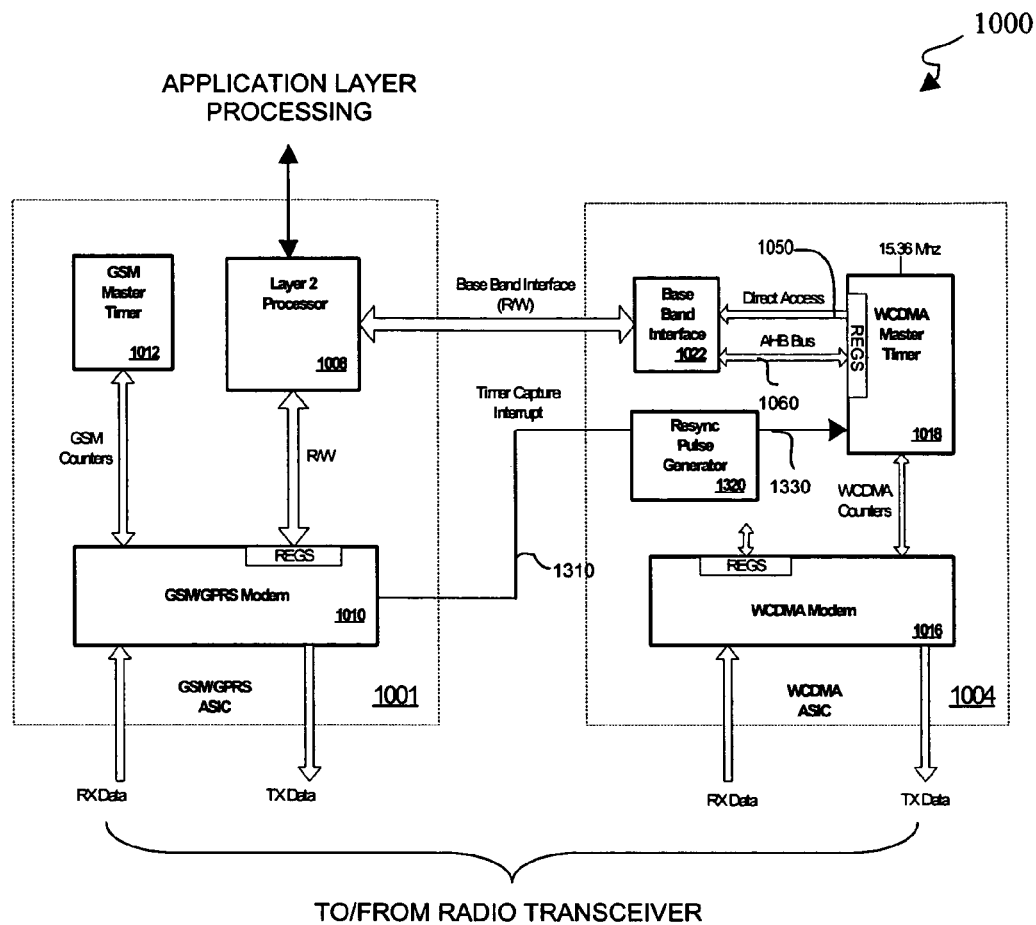
FIG. 10 illustrates a dual-mode wireless terminal baseband platform configured to provide both GSM/GPRS and WCDMA bearer services in a time-synchronized manner consistent with the present invention.

Turning now to FIG. 10, there is illustrated a dual-mode wireless terminal baseband platform 1000 configured to provide both GSM/GPRS and WCDMA bearer services in a time-synchronized manner. As shown, the baseband platform 1000 includes a "host" GSM/GPRS baseband processor 1001 comprised of a Layer 2 processor 1008 and a GSM/GPRS modem 1010. In the exemplary embodiment the Layer 2 processor 1008 comprises an ARM9 processor available from ARM, Inc. As shown, the host baseband processor 1001 further includes a master timer 1012 adapted to maintain counter values utilized by the GSM/GPRS modem 1010. The platform 1000 further includes a WCDMA baseband co-processor 1004, which contains a WCDMA modem 1016. The WCDMA baseband co-processor 1004 further includes a master timer 1018 configured to maintain counter values utilized by the WCDMA modem 1016. The WCDMA baseband co-processor 1004 operates to perform physical layer processing of WCDMA bearer signals, and interfaces with the host baseband processor 1001 through a baseband interface 1022. Various bearer-specific WCDMA stack functions are executed by the Layer 2 processor 1008 with respect to WCDMA bearer signals communicated to and from the WCDMA modem 1016 via the baseband interface 1022. In the embodiment of FIG. 10, the baseband interface 1022 comprises a shared area within the memory of the WCDMA baseband co-processor 1004. This shared memory space may be logically configured as a dual-port RAM segmented into a number of areas, each containing a different type of data. These data types may comprise, for example, control information transferred between the protocol stacks and physical layers and uplink/downlink data. As shown, communication between the baseband interface 1022 and the WCDMA master timer 1018 may be effected via a direct access read operation 1050 or over an Advanced High Speed (AHB) bus 1060. A description of an exemplary set of specifications for the AHB bus 1060 are set forth in, for example, the AMBA Specification, Revision 2.0 available from ARM, Inc. (www.arm.com).

During operation of the dual-mode wireless terminal baseband platform 1000, the Layer 2 processor 1008 executes various WCDMA-specific functions (e.g., MAC, RLC, PDCP, BMC and RRC), GSM/GPRS stack functions, as well as various common stack functions. In WCDMA-based configurations such as FIG. 10, these common stack functions would include NAS functions. Finally, the WCDMA baseband co-processor 1004 is responsible for all WCDMA-related "Layer 1" or physical layer functions.

Consistent with one embodiment of the invention, the host GSM/GPRS baseband processor 1001 acts as a master device with respect to the WCDMA baseband co-processor 1004. The host GSM/GPRS processor 1001 runs a protocol stack interface that reads and writes to the baseband interface 1022 as well as to various registers of the WCDMA baseband co-processor 1004. During operation of the platform 1000, the shared memory space comprising the baseband interface 1022 facilitates the exchange of data between the host baseband processor 1001 and the WCDMA baseband co-processor 1004 at regular intervals. When the host baseband processor 1001 reads new information stored within this shared memory space, it also writes new information for reading by the WCDMA baseband co-processor 1004. In the exemplary embodiment the host baseband processor 1001 may interrupt the WCDMA baseband co-processor 1004 at any time should it desire to write new data into the shared memory space of the baseband interface 1022. This interaction between the host GSM/GPRS baseband processor 1001 and the WCDMA baseband co-processor 1004 facilitates operation of the platform 1000 within a dual-mode system.

During operation of the dual-mode wireless terminal baseband platform 1000, both the GSM master timer 1012 and the WCDMA master timer 1018 update various counters consistent with the GSM and WCDMA protocols, respectively. These counters are relevant to control of, for example, processing of the respective incoming (Rx) and outgoing (Tx) data streams processed by the GSM/GPRS modem 1010 and the WCDMA modem 1016.

Figure 11:
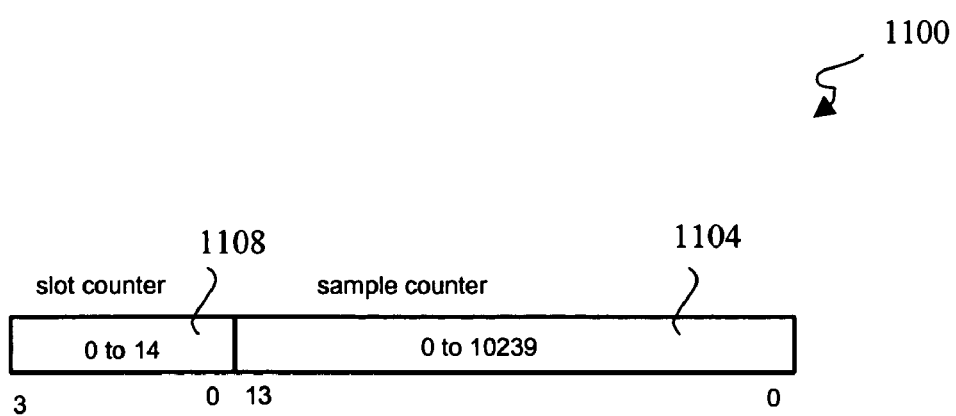
FIG. 11 provides an illustrative representation of a counter maintained by the WCDMA master timer of the WCDMA baseband co-processor.

Turning now to FIG. 11, an illustrative representation is provided of a counter 1100 maintained by the WCDMA master timer 1018 of the WCDMA baseband co-processor 1004. The counter 1100 includes two fields; namely, a sample counter 1104 and slot counter 1108. In the exemplary embodiment both of the counters 1104 and 1108 are free-running at every rising edge of the 15.36 MHz system clock (not shown) of the WCDMA baseband co-processor 1004. The sample counter 1104 is incremented at the 15.36 MHz clock rate and rolls over to 0 upon reaching a count of 10239. The slot counter 1108 increments (when its count is less than 14) or rolls over (when its count is equal to 14) when the sample counter 1104 rolls over from 10239 to 0.

As is known to those skilled in the art, the structure of counters will vary among communication systems adhering to different protocols. For example, the structure of counters maintained by the host GSM/GPRS baseband processor 1001 differs from that depicted in FIG. 11.

Consistent with the invention, the host GSM/GPRS baseband processor 1001 is disposed to synchronize its counters to the counters maintained by the WCDMA baseband co-processor 1004. In general, the host GSM/GPRS baseband processor 1001 initiates this synchronization process by either directly or indirectly determining the values of the counters maintained by the WCDMA master timer 1018. Once the values of the counters maintained by the WCDMA master timer 1018 have been captured, the host GSM baseband processor 1001 compares the values of the WCDMA counter values to those maintained by the GSM master timer 1012 and determines the timing relationship between the processors 1001, 1004. The determination of this timing relationship effectively synchronizes, within the wireless device incorporating the dual-mode wireless terminal baseband platform 1000, the timing of the applicable WCDMA and GSM/GPRS networks. Establishing such timing synchronization permits the wireless device incorporating the dual-mode wireless terminal baseband platform 1000 to operate contemporaneously in WCDMA and GSM/GPRS networks, and/or to be "handed off" between such networks.

There exist at least two potential methods for synchronizing or determining the relationship between the GSM/GPRS and WCDMA counters in accordance with the invention. Specifically, the host GSM/GPRS baseband processor 1001 may determine the values of the counters maintained by the WCDMA master timer 1018 through execution of either a "direct access read" or an "interrupt capture" method. These methods are described with reference to FIGS. 12 and 13, respectively.

Figure 12:
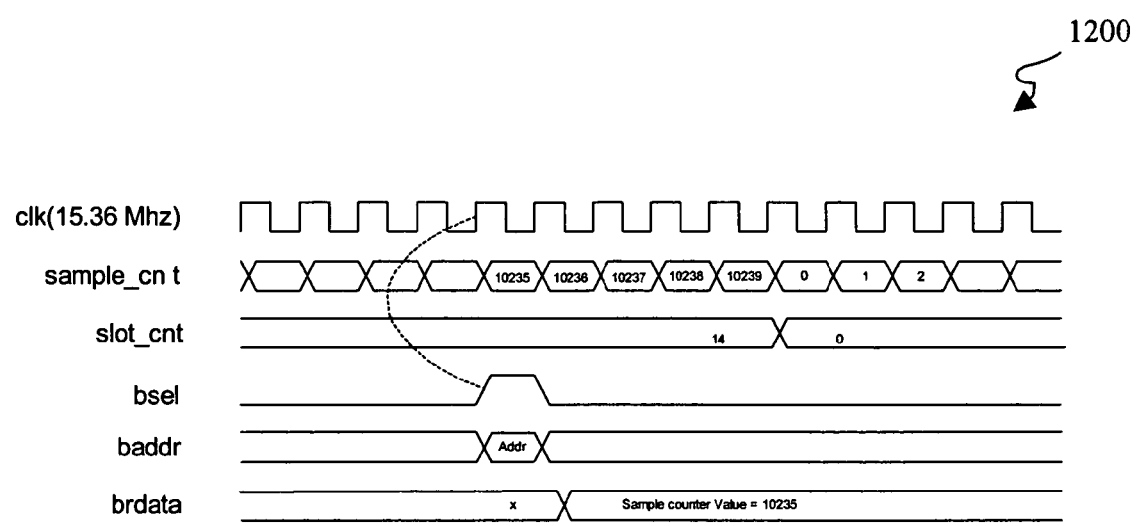
FIG. 12 shows a timing diagram which illustratively represents a timing synchronization method predicated upon execution of a direct access read operation.

Referring now to FIG. 12, there is shown a timing diagram 1200 which illustratively represents a timing synchronization method predicated upon execution of a direct access read operation. Pursuant to this synchronization method, the GSM/GPRS baseband processor 1001 performs a direct access read operation upon the "live" counter values generated by the WCDMA master timer 1018. Consistent with this direct access approach, the fields of a given counter value generated by the WCDMA master timer 1018 are each read 1050 (FIG. 10) by the GSM/GPRS baseband processor 1001 during a different deterministic WCDMA clock cycle. In this regard the term "deterministic" indicates that the instantaneous value of at least one counter maintained by the GSM master timer 1012 is known at the time of executing this direct access read operation; that is, the GSM/GPRS baseband processor 1001 will generally be configured to perform this direct access read operation when a particular GSM counter reaches a predetermined value. In FIG. 12, bsel is representative of a re-synchronized read pulse received from the GSM/GPRS baseband processor 1001. In addition, baddr represents an address bus capable of addressing registers of the WCDMA master timer 1018, and brdata corresponds to the data bus through which a register of the WCDMA master timer 1018 is read in connection with read operation 1050.

Figure 13:
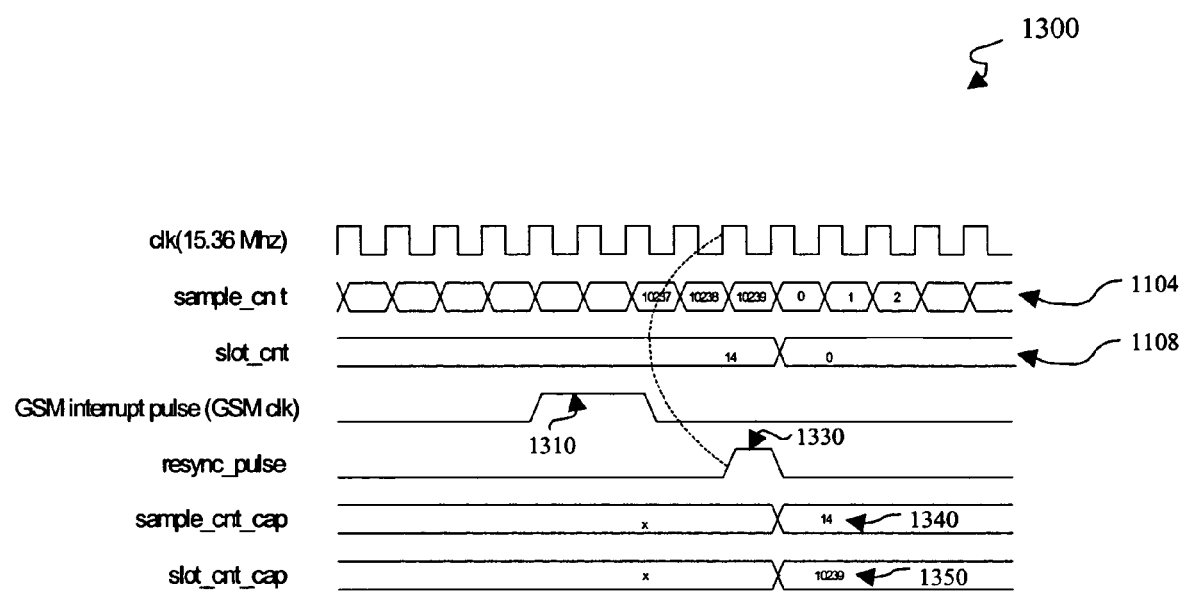
FIG. 13 depicts a timing diagram illustratively representing a timing synchronization method predicated upon execution of an interrupt capture operation.

Attention is now directed to FIG. 13, which depicts a timing diagram 1300 illustratively representing a timing synchronization method predicated upon execution of an interrupt capture operation. As mentioned above, the direct access approach illustrated by FIG. 12 generally requires that each field of a given counter value maintained by the WCDMA master timer 1018 be read during a different deterministic WCDMA clock cycle. In the approach of FIG. 13, all fields of a WCDMA counter may be captured during the same deterministic clock cycle (i.e., during the WCDMA clock cycle which occurs upon a given counter maintained by the GSM master timer 1012 reaching a predetermined value). In particular, when a particular GSM counter reaches a predetermined value the GSM/GPRS baseband processor 1001 sends an interrupt pulse 1310 to a resynchronization pulse generator 1320 (FIG. 10) of the WCDMA baseband processor 1004. In response, the resynchronization pulse generator 1320 generates a resynchronization pulse 1330 which is provided to the WCDMA master timer 1018. Upon receipt of this interrupt pulse by the WCDMA master timer 1018, the WCDMA modem 1016 is instructed to capture a value 1340 of its sample counter 1104 and a value 1350 of its slot counter 1108 and store them within its sample_cnt_cap and slot_cnt_cap registers, respectively. This advantageously permits the GSM/GPRS baseband processor 1001 to access these stored values pursuant to a direct access read operation.

Accordingly, the present invention presents a method through which the functionality of existing baseband processor platforms for wireless devices may be extended to implement additional wireless standards in a cost effective manner. Although the embodiments of the invention described herein pertain to devices operative in, for example, GSM/GPRS and WCDMA systems, the present invention is also applicable to devices contemporaneously operative in multiple modes within "multi-standard" environments (e.g., environments serviced by combinations of various cellular and wireless LAN systems).

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A multi-mode wireless communication device, comprising:
   a host baseband processor configured to operate in accordance with a first wireless communications protocol of a first wireless communications system; and
   a baseband co-processor configured to operate in accordance with a second wireless communications protocol of a second wireless communications system,
   wherein said host baseband processor is operable to time synchronize said second wireless communications system to said first wireless communications system based on timing information transferred to said host baseband processor from said baseband co-processor.

2. The multi-mode wireless communications device of claim 1, wherein said host baseband processor comprises circuitry for issuing, from said host baseband processor, a timer capture interrupt to said baseband co-processor during a predetermined timer phase of said first wireless communications system.

3. The multi-mode wireless communication device of claim 2, wherein said baseband co-processor is configured to provide at least one timer value pertinent to a timing state of said second wireless communications system to said host baseband processor in response to issuance of said timer capture interrupt, said host baseband processor enables determining of a timing difference between said first and second wireless communication systems based upon said predetermined timer phase and said at least one timer value.

4. The multi-mode wireless communications device of claim 1, wherein said host baseband processor comprises circuitry for reading a current value of at least one timer maintained by said baseband co-processor consistent with said second wireless communications protocol.

5. The multi-mode wireless communications device of claim 1, wherein said host baseband processor comprises a higher-layer processing module and a modem for interfacing with said first wireless communication system, said higher-layer processing module being operatively coupled to said modem and to a baseband interface of said baseband co-processor.

6. The multi-mode wireless communications device of claim 3, wherein said second wireless communications protocol comprises WCDMA, and said baseband co-processor includes first and second registers adapted to store said at least one timer value and an additional timer value pertinent to said second wireless communications protocol.

7. The multi-mode wireless communications device of claim 6, wherein said at least one timer value corresponds to a slot counter and said additional timer value corresponds to a sample counter.

8. The multi-mode wireless communications device of claim 1, wherein said host baseband processor comprises a higher-layer processor configured to effect higher-layer processing of information processed by said baseband co-processor.

9. A timing synchronization method, comprising:
   configuring a host baseband processor of a multi-mode device to operate in accordance with a first wireless communications protocol of a first wireless communications system;
   configuring a baseband co-processor of a multi-mode device to operate in accordance with a second wireless communications protocol of a second wireless communications system; and
   establishing, by said host baseband processor within said device, timing synchronization of said second wireless communication system to said first wireless communications system based on timing information transferred to said host baseband processor from said baseband co-processor.

10. The method of claim 9, wherein said establishing includes issuing a timer capture interrupt to said baseband co-processor.

11. The method of claim 10, wherein said establishing comprises providing at least one timer value pertinent to a timing state of said second wireless communications system to said host baseband processor in response to issuance of said timer capture interrupt.

12. The method of claim 9, wherein said establishing includes reading a current value of at least one timer maintained by said baseband co-processor consistent with said second wireless communications protocol.

13. The method of claim 11, wherein said second wireless communications protocol comprises WCDMA, and said establishing includes storing at least one timer value and an additional timer value pertinent to an additional timing state of said second wireless communications system in first and second registers of said baseband co-processor.

14. The method of claim 9, wherein said host baseband processor is configured to effect higher-layer processing of information processed by said baseband co-processor.

15. A method for wireless communication, the method comprising:
   generating by a host baseband processor within a multi-mode communication device, a timer capture interrupt during a predetermined timing phase of a first wireless communication system, wherein said host baseband processor within said multi-mode communication device communicates via a first wireless protocol with said first wireless communication system, and wherein a baseband co-processor within said multi-mode communication device communicates via a second wireless protocol with a second wireless communication system;
   receiving by said host baseband processor from said baseband co-processor, a timer value of at least one timing state pertinent to operation of said second wireless communication system in response to said baseband co-processor receiving said generated timer capture interrupt;
   storing and/or reading said timer value; and
   determining by said host baseband processor a timing relationship for synchronizing said second wireless communication system to said first wireless communication system, based upon said received timer value from said baseband co-processor.

16. The method of claim 15, comprising:
   storing an additional timer value of at least one other timer pertinent to operation of said second wireless communication system in response to said timer capture interrupt; and reading said additional timer value, said timing relationship being based at least in part upon said additional timer value.

17. The method of claim 15, wherein one or more timers are incremented pursuant to operation of said first wireless communication system, said determining a timing relationship including comparing at least one value of said one or more timers with said timer value.

18. The method of claim 15, wherein said first wireless communications system operates in accordance with a first wireless communications protocol, and said second wireless communications system operates in accordance with a second wireless communications protocol different from said first wireless communications protocol.

19. The method of claim 18, wherein said first wireless communications protocol comprises GSM, and said second wireless communications protocol comprises WCDMA.

20. A multi-mode wireless communication device, comprising:
a host baseband processor configured to operate in accordance with a first wireless communications protocol of a first wireless communications system; and
a baseband co-processor configured to operate in accordance with a second wireless communications protocol of a second wireless communications system,
wherein said host baseband processor is operable to time synchronize said second wireless communications system to said first wireless communications system based on timing information transferred to said host baseband processor from said baseband co-processor, wherein said host baseband processor comprises circuitry for issuing, from said host baseband processor, a timer capture interrupt to said baseband co-processor during a predetermined timer phase of said first wireless communications system, and wherein said baseband co-processor is configured to provide at least one timer value pertinent to a timing state of said second wireless communications system to said host baseband processor in response to issuance of said timer capture interrupt, said host baseband processor enables determining of a timing difference between said first and second wireless communication systems based upon said predetermined timer phase and said at least one timer value.

21. The multi-mode wireless communications device of claim 20, wherein said host baseband processor comprises circuitry for reading a current value of at least one timer maintained by said baseband co-processor consistent with said second wireless communications protocol.

22. The multi-mode wireless communications device of claim 20, wherein said host baseband processor comprises a higher-layer processing module and a modem for interfacing with said first wireless communication system, said higher-layer processing module being operatively coupled to said modem and to a baseband interface of said baseband co-processor.

23. The multi-mode wireless communications device of claim 20, wherein said second wireless communications protocol comprises WCDMA, and said baseband co-processor includes first and second registers adapted to store said at least one timer value and an additional timer value pertinent to said second wireless communications protocol.

24. The multi-mode wireless communications device of claim 23, wherein said at least one timer value corresponds to a slot counter and said additional timer value corresponds to a sample counter.

25. The multi-mode wireless communications device of claim 20, wherein said host baseband processor comprises a higher-layer processor configured to effect higher-layer processing of information processed by said baseband co-processor.

26. A timing synchronization method, comprising:
configuring a host baseband processor of a multi-mode device to operate in accordance with a first wireless communications protocol of a first wireless communications system;
configuring a baseband co-processor of a multi-mode device to operate in accordance with a second wireless communications protocol of a second wireless communications system; and
establishing, by said host baseband processor within said device, timing synchronization of said second wireless communications system to said first wireless communications system based on timing information transferred to said host baseband processor from said baseband co-processor, wherein said establishing includes issuing a timer capture interrupt to said baseband co-processor, and wherein said establishing comprises providing at least one timer value pertinent to a timing state of said second wireless communications system to said host baseband processor in response to issuance of said timer capture interrupt.

27. The method of claim 26, wherein said establishing includes reading a current value of at least one timer maintained by said baseband co-processor consistent with said second wireless communications protocol.

28. The method of claim 26, wherein said second wireless communications protocol comprises WCDMA, and said establishing includes storing at least one timer value and an additional timer value pertinent to an additional timing state of said second wireless communications system in first and second registers of said baseband co-processor.

29. The method of claim 26, wherein said host baseband processor is configured to effect higher-layer processing of information processed by said baseband co-processor.

30. A multi-mode wireless communication device, comprising:
a host baseband processor configured to operate in accordance with a first wireless communications protocol of a first wireless communications system; and
a baseband co-processor configured to operate in accordance with a second wireless communications protocol of a second wireless communications system,
wherein said host baseband processor is operable to time synchronize said second wireless communications system to said first wireless communications system based on timing information transferred to said host baseband processor from said baseband co-processor, wherein said host baseband processor comprises circuitry for issuing, from said host baseband processor, a timer capture interrupt to said baseband co-processor during a predetermined timer phase of said first wireless communications system, and wherein said baseband co-processor is configured to provide at least one timer value pertinent to a timing state of said second wireless communications system in response to issuance of said timer capture interrupt, said host baseband processor enables determining of a timing difference between said first and second wireless communication systems based upon said predetermined timer phase and said at least one timer value.

31. The multi-mode wireless communications device of claim 30, wherein said baseband co-processor comprises circuitry for reading a current value of at least one timer consistent with said second wireless communications protocol.

32. The multi-mode wireless communications device of claim 30, wherein said host baseband processor comprises a higher-layer processing module and a modem for interfacing with said first wireless communication system, said higher-layer processing module being operatively coupled to said modem and to a baseband interface of said baseband co-processor.

33. The multi-mode wireless communications device of claim 30, wherein said second wireless communications protocol comprises WCDMA, said baseband co-processor including first and second registers adapted to store said at least one timer value and an additional timer value pertinent to said second wireless communications protocol.

34. The multi-mode wireless communications device of claim 33, wherein said at least one timer value corresponds to a slot counter and said additional timer value corresponds to a sample counter.

35. The multi-mode wireless communications device of claim 30, wherein said host baseband processor comprises a higher-layer processor configured to effect higher-layer processing of information processed by said baseband co-processor.

* * * * *